United States Patent [19]

Ideta

[11] Patent Number: 4,598,612

[45] Date of Patent: Jul. 8, 1986

[54] PUMP CONTROL ARRANGEMENT FOR AUTOMATIC AUTOMOTIVE TRANSMISSION OR THE LIKE

[75] Inventor: Yasufumi Ideta, Sagamihara, Japan

[73] Assignee: Nissan Motor Company, Limited, Yokohama, Japan

[21] Appl. No.: 591,849

[22] Filed: Mar. 21, 1984

[30] Foreign Application Priority Data

Apr. 1, 1983 [JP] Japan .................................. 58-57258

[51] Int. Cl.⁴ .............................................. B60K 41/16
[52] U.S. Cl. .................... 74/867; 74/752 C; 74/869
[58] Field of Search .............. 74/869, 868, 867, 752 C

[56] References Cited

U.S. PATENT DOCUMENTS

| | | | |
|---|---|---|---|
| 2,896,468 | 7/1959 | Cheek et al. | 74/869 |
| 2,919,597 | 1/1960 | Borman, Jr. | 74/869 |
| 2,926,543 | 3/1960 | Holdeman et al. | 74/869 |
| 2,950,629 | 8/1960 | Holdeman et al. | 74/869 |
| 3,077,122 | 2/1963 | Olsen | 74/869 X |
| 3,078,736 | 2/1963 | Meads et al. | 74/867 |
| 3,159,051 | 12/1964 | Herndon et al. | 74/869 X |
| 3,592,083 | 7/1971 | Kawabata | 74/868 |
| 3,937,108 | 2/1976 | Will | 74/866 |
| 4,301,697 | 11/1981 | Iwanaga et al. | 74/869 |

FOREIGN PATENT DOCUMENTS

| | | |
|---|---|---|
| 433241 | 6/1968 | Australia . |
| 1680637 | 12/1969 | Fed. Rep. of Germany . |
| 2024834 | 11/1970 | Fed. Rep. of Germany . |
| 2248443 | 5/1975 | France . |
| 5551152 | 3/1978 | Japan . |
| 1414021 | 11/1975 | United Kingdom . |
| 1427877 | 3/1976 | United Kingdom . |

OTHER PUBLICATIONS

"A New Automatic Transmission for Improved Fuel Economy—General Motors THM 125", Erkki A. Koivunen & Philip A. Le Bar, Jr., Society of Automotive Engineers, 1979.
Patent Abstracts of Japan, vol. 4, No. 94, Jul. 8, 1980.
European Search Report.

Primary Examiner—Kenneth J. Dorner
Assistant Examiner—Dirk Wright
Attorney, Agent, or Firm—Schwartz, Jeffery, Schwaab, Mack, Blumenthal & Evans

[57] ABSTRACT

In order to prevent excessive pump output drain off and ensure that the hydraulic pressure supplied to a control chamber of a variable capacity pump of a hydraulically controlled automatic automotive transmission control system, is maintained at an appropriate level with respect to the control pressure (line pressure) being utilized in the control system, a pressure limiting valve is disposed between a drain port of a pressure regulating valve and the torque converter which operatively interconnects the prime mover (engine) with transmission. This pressure limiting valve includes a spool which is biased in a direction to reduce the pressure passed therethrough to the torque converter by the pressure prevailing in a feedback chamber which communicates with the conduiting between the valve and the torque converter.

4 Claims, 5 Drawing Figures

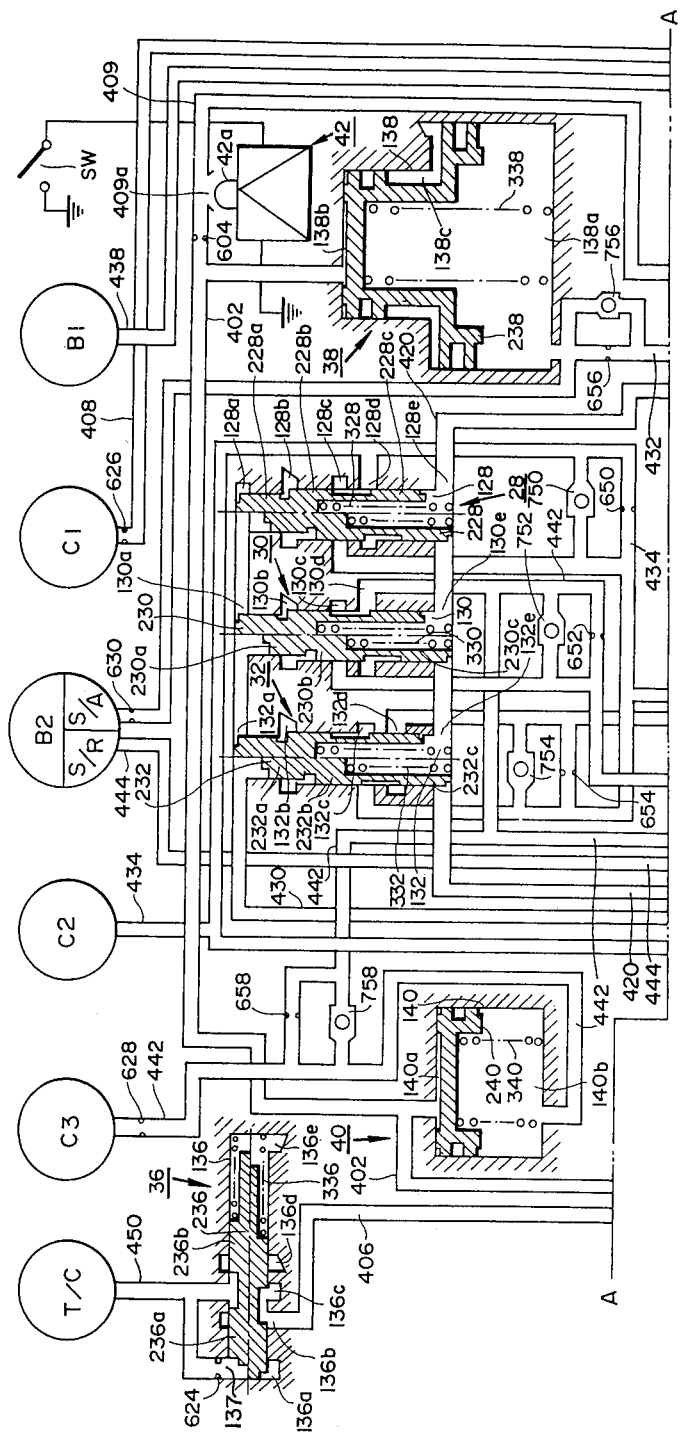

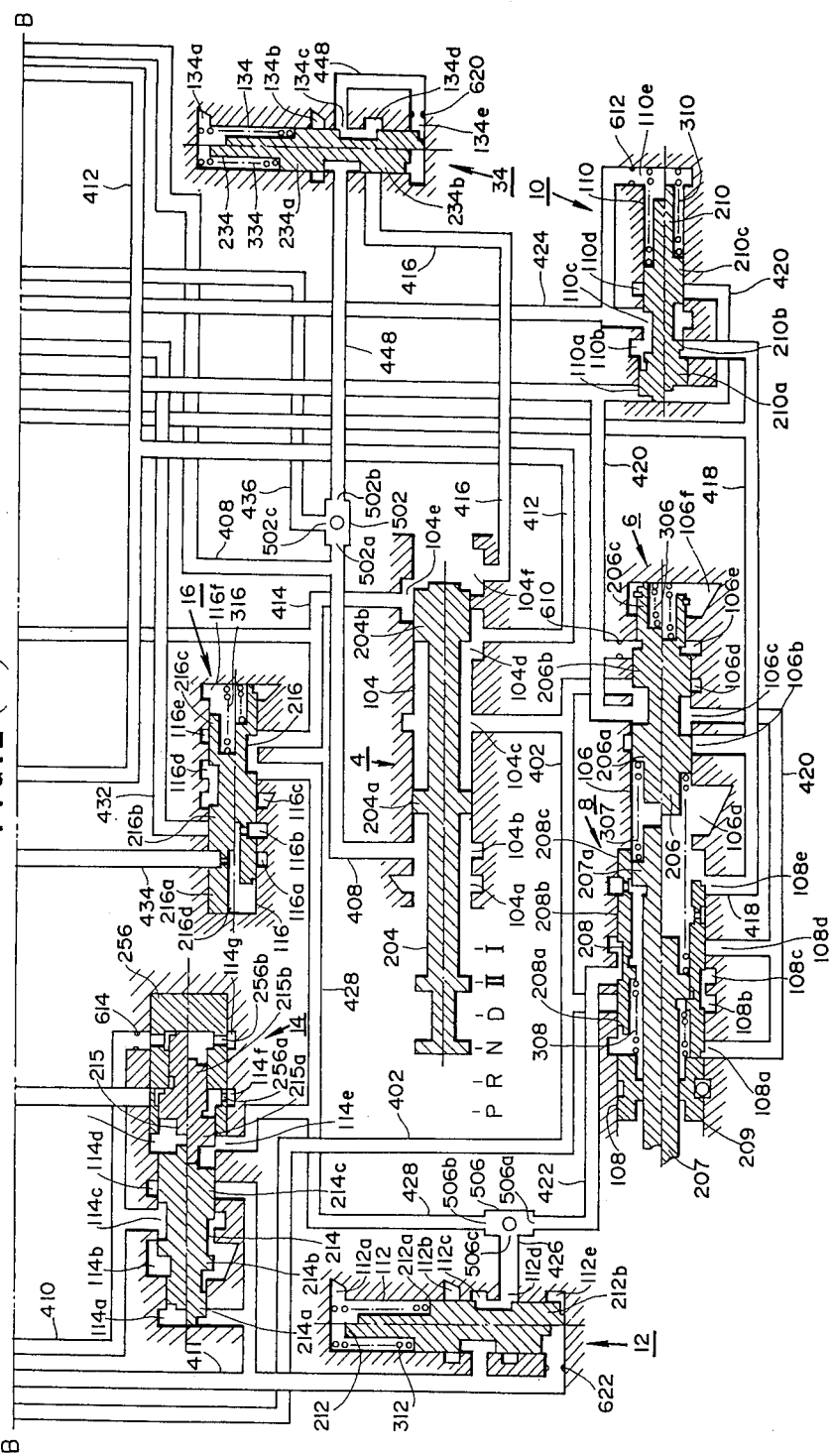

PUMP CONTROL ARRANGEMENT FOR AUTOMATIC AUTOMOTIVE TRANSMISSION OR THE LIKE

BACKGROUND OF THE INVENTION

The present invention relates generally to an automatic automotive transmission and more specifically to a control system therefor which features an improved pump control arrangement.

DESCRIPTION OF THE PRIOR ART

SAE paper No. 790725 issued by the Society of Automotive Engineers, Inc., of the United States of America, discloses an arrangement wherein the hydraulic fluid discharged from an oil pump of a planetary gear train control circuit is supplied to the torque converter associated with the transmission following pressure regulation by a pressure regulator valve. However, this arrangement has encountered the drawback that during stall or the like condition of the torque converter, unwantedly high pressure is supplied thereinto and tends to induce the deformation of the various elements constituting same. To offset this tendency and the inevitable rapid deterioration converter of relatively thick robust sheet sheel. This, however, increases both the weight and production cost of the device.

One attempt to overcome this problem has been proposed in Japanese Patent Application First Provisional Publication No. 55-51152. In this arrangement a gear type oil pump is used in place of the previously mentioned variable capacity type and the pressure fed to the torque converter controlled by a relief valve. This enables the use of thinner and lighter sheet steel in the torque conveter but lacks the energy conserving characteristics of the variable capacity type pump.

A further attempt (known to the applicant) to permit the use of lighter sheet steel steel during the fabrication of the torque conveter and to simultaneously obtain the desired energe conserving charateristics possible with a variable capacity type pump, has taken the form of the arrangement shown in FIG. 1 of the drawings. In this arrangement a variable capacity oil pump O/P is combined with a simple relief valve 58 in a manner that the hydraulic fluid drained off from the pressure regulator valve 2 via port 102f is fed, via conduit 406 and relief valve 58 to the torque converter T/C. Upon a predetermined pressure prevailing in the conduit 406 the relief valve 58 opens and vents the excess pressure via drain port 158c.

However, an unexpected problem has been encountered with this ("Internal prior art") arrangement in that, upon the drain port 158c of the relief valve 58 opening, the flow of hydraulic pressure tends to be such that the pressure which would normally develop at port 102b and bias the spool 202 of the pressure regulator 2 downwardly against spring 302 to establish communication between ports 102e and 102d does not occur to the required degree and the pressure fed from port 102d to the control chamber C/C of the variable capacity pump O/P drops below the required level under such conditions. Accordingly, the eccentricity of the pump O/P increases inducing the discharge of an excessive amount of hydraulic fluid. This increase discharge is sufficient to maintain the pressure in conduit at a level sufficient to maintain the spool 258 of the relief valve 58 in the position illustrated by the left hand half section thereof and permit the drainage of the excessive amounts of the hydraulic fluid discharged by the pump O/P. Accordingly, the pump tends to be operated in a non-economical manner wherein otherwise useful amounts of engine power are wastefully consumed in driving same. Further, due to the large quantity of hydraulic fluid discharged by the pump under these conditions, tends to induce noise generating "cavitation" in the hydraulic circuitry downstream of the pump.

The above mentioned overdischarge phenonomenon is illustrated graphically in FIG. 3. In this figure, the broken line traces Q', P', E' and T' respectively indicate, in terms of pump RPM, the amount of hydraulic fluid discharged by the pump, the pressure which develops in the control chamber C/C of the pump O/C, the eccentricity of the pump and the amount of torque required by the pump. As will be readily appreciated from the broken line trace P', the pressure which develops in the control chamber C/C is notably lower than solid line trace P (which denotes the appropriate pressure). This induces corresponding lack of reduction in excentricity (c.f. broken line trace E' and solid line trace E), the excessive amount of hydraulic fluid discharged by the pump and the attendant increased amount of torque consumed by the pump, under such conditions.

As will be particularly clear from the broken line trace T', the amount of torque which is consumed with the FIG. 1 arrangement is notably in excess of that required for the given line pressure developed.

SUMMARY OF THE INVENTION

It is an object of the present invention to provide an arrangement whereby the pressure which is fed to the control chamber of a variable capacity type oil pump of an automatic transmission is suitably controlled to prevent excessive energy consumption by the pump.

In brief, the above object is fullfilled by an arrangement wherein, in order to prevent excessive pump output drain off and ensure that the hydraulic pressure supplied to a control chamber of a variable capacity pump of a hydraulically controlled automatic automotive transmission control system, is maintained at an appropriate level with respect to the control pressure (line pressure) being utilized in the control system, a pressure limiting valve is disposed between a drain port of a pressure regulating valve and the torque converter which operatively interconnects the prime mover (engine) with transmission. This pressure limiting valve includes a spool which is biased in a direction to reduce the pressure passed therethrough to the torque converter by the pressure prevailing in a feedback chamber which communicates with the conduiting between the valve and the torque converter.

More specifically, the present invention takes the form of a transmission having a torque converter and a hydraulic control circuit for controlling the transmission which is characterized by a variable capacity pump for supplying fluid under pressure, the pump having a control arrangement including a control chamber, the control arrangement varying capacity of the pump in response to the pressure prevailing in the control chamber, a pressure regulator valve for regulating the output of the pump by draining off some of the fluid discharged by the pump and for developing a control pressure, the pressure regulating pump having first and second drain ports, the first drain port fluidly communicating with the torque converter through a first conduit, the second drain port fluidly communicating with the control chamber through a second conduit, and a pressure limiting valve disposed in the first conduit for limiting the pressure fed to the torque converter therethrough, the pressure limiting valve having a feedback chamber which is supplied with the pressure prevailing in the first conduit downstream of the pressure limiting valve.

BRIEF DESCRIPTION OF THE DRAWINGS

The features and advantages of the arrangement of the present invention will become more clearly appreciated from the following description taken in conjunction with the accompanying drawings in which:

FIGS. 2(a), 2(b) and 2(c) when combined, illustrate schematically, a hydraulic control circuit for an automatic automotive transmission which incorporates therein an embodiment of the present invention.

DESCRIPTION OF THE PREFERRED EMBODIMENTS

Figure 2B:
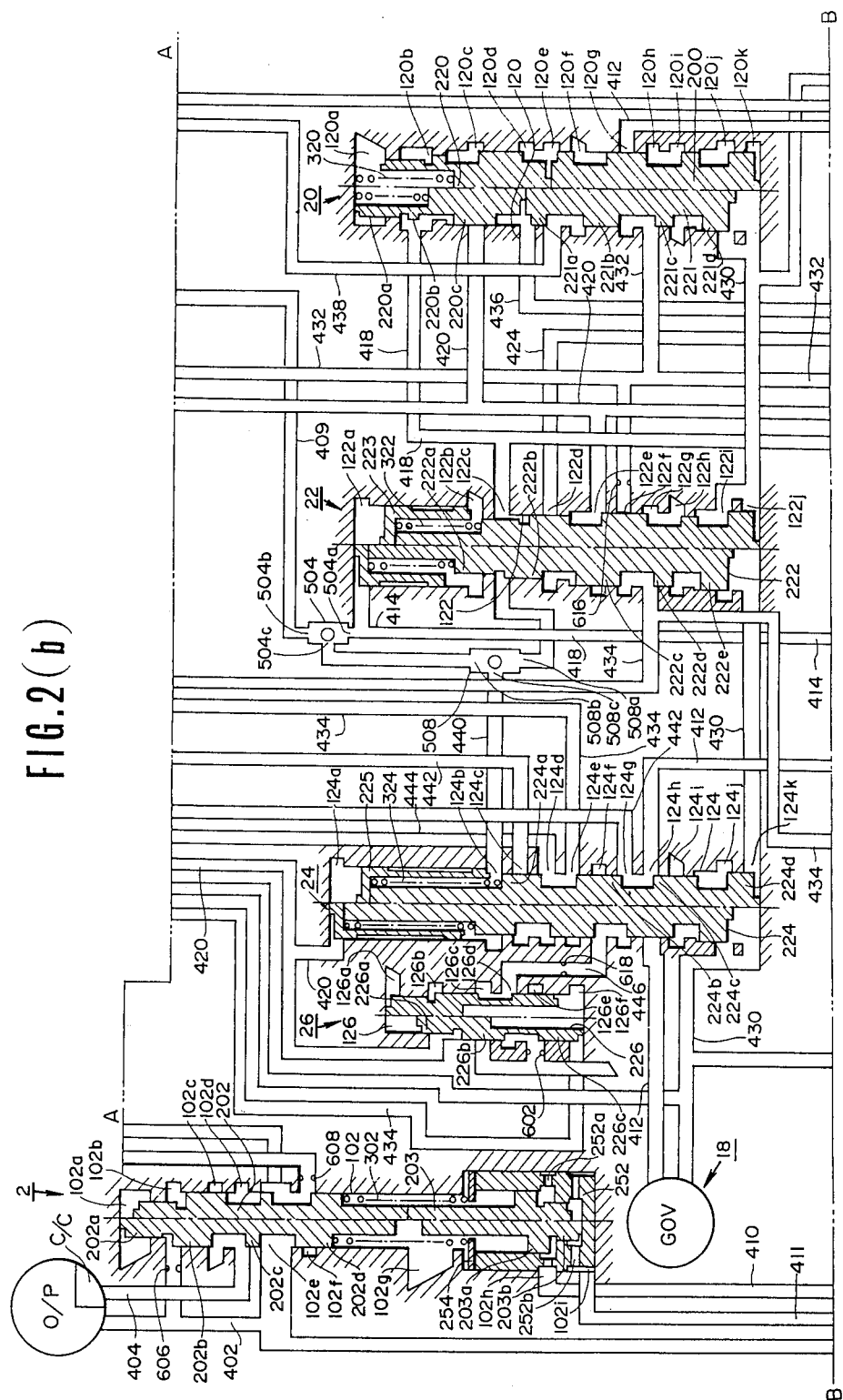

FIGS. 2(a), 2(b) and 2(c) shown a hydraulic control circuit for use with an automatic automotive transmission in which a embodiment of the present invention is incorporated.

This hydraulic control circuit comprises a regulator valve 2, a manual valve 4, a throttle valve 6, a throttle fail safe valve 8, a throttle modulator valve 10, a pressure modifier valve 12, a cut back valve 14, a line pressure booster valve 16, a governor valve 18, a 1-2 shift valve 20, a 2-3 shift valve 22, a 3-4 shift valve 24, a 2-4 timing valve 26, a 2-3 timing valve 28, a 3-4 timing valve 30, a 3-2 timing valve 32, a first manual range pressure reducing valve 34, a torque converter pressure reducing or limiting valve 36, a 1-2 accumulator 38, a 4-3 accumulator 40, and an overdrive inhibitor solenoid 42. These valves are interconnected as shown in FIGS. 2(a), 2(b), and 2(c), and connected with an oil pump O/P, the torque converter T/C, clutches C1, C2 and brakes B1 and B2 as shown, the brake B2 has a servo apply chamber S/A, i.e., an oil pressure chamber designed to apply the brake when pressurized, and a servo release chamber S/R, i.e., an oil pressure chamber designed to release the brake when pressurized. The servo release chamber S/R has a larger effective area than that of the servo apply chamber S/A, whereby the brake B2 is released whenever pressure is supplied to the servo release chamber S/R irrespective of the pressurization of the servo apply chamber S/A. The overdrive inhibitor solenoid 42 is electrically connected with an overdrive inhibitor switch SW.

To ensure a proper understanding of the present embodiment, a brief description of the construction and operation of each of the elements constituting the above circuit will be given.

Referring to FIG. 2(b), the regulator valve 2 comprises a valve bore 102 formed with nine ports 102a to 102i and a spool 202 having formed thereon four lands 202a to 202d slidably disposed on the valve bore 102. It also comprises a stationary sleeve 252, formed with two ports 252a and 252b, fixed relative to the valve bore 102, a spool 203 having formed thereon lands 203a and 203b slidably disposed in said stationary sleeve 252, a spring 302 arranged between the land 202d of the spool 202 and a spring seat 254 mounted on the upper end of the sleeve 252 as viewed in FIG. 2(b). The lands 202b, 202c and 202d are the same in diameter while the land 202a is smaller in diameter than the others. The land 203a of the spool 203 is larger in diameter than the land 203b thereof. Ports 102a, 102c and 102g are drain ports. The ports 102b and 102e are connected with a conduit 402 (the line pressure circuit). An orifice 606 is provided in port 102b. Port 102d is connected via a conduit 404 with a variable volume chamber C/C of the pump O/P. The pump O/P is a vane pump of the variable volume discharge type and is designed to decrease the discharge rate of the oil flow in response to pressure supplied to the oil chamber C/C. Port 102f is connected via a conduit 406 with a port 136b of a torque converter pressure reducing or limiting valve 36 shown in FIG. 2(a). An orifice 608 is provided in conduit 406. Port 102h is connected via a conduit 410 with ports 114c and 114g of the cut back valve 14, while port 102i is connected via a conduit 411 with ports 114a and 114d of the cut back valve 14 and also with ports 112c and 112e of the pressure modifier valve 12.

The regulator valve 2 regulates the line pressure in conduit 402 in th following manner. Oil pressure from port 102b acts on a differential area between the lands 202a and 202b of the spool 202, applying a downward force, as seen in FIG. 2(b), to the spool 202. On the other hand, the spool 202 is subject to the sum of an upward force provided by the spring 302 and another upward force (described hereinlater) acting on the spool 203. Since the oil within the port 102e which port 102b is connected with, is adapted to be discharged to port 102f, the oil pressure in port 102b is regulated to a value at which the downward force created by the oil pressure in port 102b balances with the sum of the two upward forces. If, as a result of an increase in the oil pressure in port 102b, the downward force increases above the sum of the upward forces, the spool 202 moves slightly downward, forming a clearance between the land 202d and port 102f, allowing the oil in port 102e to flow via this clearance to the port 102f resulting in a reduction in the oil pressure in port 102e which in turn results in a reduction in the oil pressure in port 102b which communicates via conduit 402 with port 102e. The reduction in oil pressure in port 102b causes a reduction in the downward force, allowing the spool 202 to move back upward. This action is repeated continuously whereby the oil pressure in port 102b, i.e., the oil pressure in the oil conduit 402 is regulated to a value at which the downward force always balances with the sum of the upward forces. The oil pressure regulated in this manner (viz., the line pressure) is variable with the upward force applied to the spool 203 because the force exerted by spring 302 is constant. As shown, ports 102h and 102i of the valve bore 102 register with ports 252a and 252b of the sleeve 252, respectively. This permits the pressure in conduit 410 acting on a differential area between the lands 203a and 203b of the spool 203 and the pressure in the oil conduit 411 to act on the bottom end of the land 203b, creating the previously mentioned upward force with which the spool 203 urges the spool 202 upward. Therefore, the line pressure is regulated in response to the oil pressure in conduit 410 and that in the oil conduit 411.

Referring to FIG. 2(c), the manual valve 4 comprises a valve bore 104 formed with six ports 104a to 104f and a spool 204 having formed thereon two lands 204a and 204b slidably disposed on the valve bore 104. The spool 204 is actuated by a shift lever disposed near a driver's seat, both not being illustrated, and is movable between six detent positions, i.e., a parking position "P", a reverse drive position "R", a neutral position "N", a forward automatic drive position "D", a manual second position "II", and a manual first position "I". Port 104a is a drain port, while port 104b is connected via a conduit 408 with the clutch C1 at an fluid operated actuator therein, not shown, and also with a port 502a of a shuttle valve 502. Port 104c is connected with the previously mentioned oil conduit 402 which defines the line pressure circuit). Port 104d is connected via a conduit 412 with a port 120g of the 1-2 shift valve 20, a port 124h of the 3-4 shift valve 24, and the governor valve 18. Port 104e is connected via a conduit 414 with a port 116e of the line pressure booster valve 16, a port 122a of the 2-3 shift valve 22 and a port 504a of a shuttle valve 504, both being shown in FIG. 2(b). The port 104f is connected via a conduit 416 with a port 134d of the manual first range pressure reducing valve 34. As shown in the following Table, the port 104c which is supplied with the line pressure is allowed to communicate with a port or ports indicated by the sign "o" in response to a position selected by the spool 204. The other port or ports are not pressurized.

TABLE

| Spool Position | Port | | | |
|---|---|---|---|---|
| | 104b | 104d | 104e | 104f |
| P | | | | |
| R | o | | | |
| N | | | | |
| D | | o | | |
| II | | o | o | |
| I | | o | o | o |

Referring to FIG. 2(c), the throttle valve 6 comprises a valve bore 106 formed with six ports 106a to 106f and a spool 206 having formed thereon three lands 206a to 206c slidably disposed in the valve bore 106. A spring 306 is disposed in the valve bore 106 to bias the spool 206 leftward as viewed in FIG. 2(c). Also slidably disposed in the valve bore 106 is a plunger 207 operatively connected to an accelerator pedal (not shown). Between the plunger 207 and the spool 206 is a spring 307. The land 206c is smaller in diameter tha the other two lands 206a and 206b. Ports 106a and 106f and drain ports. Ports 106b is connected with a circuit 418, i.e., a kickdown pressure circuit, to receive a kickdown pressure (equal to line pressure) only when the accelerator pedal is depressed to a kickdown position thereof which will be described later. When the accelerator pedal is not in the kickdown position, port 106b is connected with the drain port 106a. The ports 106c and 106e are connected with a conduit 420, i.e., a throttle pressure circuit, and the port 106d is connected with conduit 402, (line pressure circuit). An orifice 610 is provided in the inlet of port 106e.

With the throttle valve 6 thus constructed, pressure in the ports 106c and 106e is obtained after a well known pressure regulation is carried out using the line pressure in port 106d as a source of pressure until the sum of a leftward force by the spring 306 and a leftward force created by the oil pressure in port 106e acting onthe differential area between the lands 206b and 206c balances with a rightward force by the spring 307. Thus, pressure proportional to the bias force of the spring 307 builds up in conduit 420. However, since the bias force of the spring 307 is varied by the plunger 207 operated by the accelerator pedal, the oil pressure, i.e., a throttle pressure, in the oil conduit 420 is proportional to the depression degree of the accelerator pedal or the throttle opening degree of the throttle valve mounted in an intake passage of the engine. Under kickdown, the throttle valve 6 is pushed inwardly by the plunger 207 via the spring 307 to the right as viewed in FIG. 2(c) to the upper half position thereof so that it ceases its pressure regulating function. Under this condition, the line pressure is supplied also to conduit 420 and past a port 108e to conduit 418 and to port 106b which serves as a drain port.

The throttle fail safe valve 8 comprises a valve bore 108 connected with and formed coaxially with the valve bore 106 of the throttle valve 6. The valve bore 108 is formed with five ports 108a to 108e and slidably receives therein a sleeve 208 having formed thereon three lands 208a to 208c. The throttle fail safe valve 6 also comprises the before mentioned plunger 207, the land 207a of which is slidably disposed in the sleeve 208 for axial movement, a plug 209 closing the open end of valve bore 108, and a spring 308 arranged between the plug 209 and the sleeve 208. The end plug 209 is formed with an aperture which allows the plunger 207 to pass therethrough. Port 108a and 108d of the valve bore 108 are connected with conduit 420 (throttle pressure circuit), and the pot 108b is connected with conduit 402 (line pressure circuit). Port 108c is connected via conduit 422 with a port 506a of a shuttle valve 506. Port 108e is connected with conduit 418, i.e., the previously mentioned kickdown circuit.

The throttle fail safe valve 8 thus constructed functions to alleviate the force required to push the plunger 207 inwardly, so the accelerator pedal is prevented from being excessively loaded by the spring 307 when the pedal is depressed. The throttle pressure supplied to port 108a prevails in the interior of the sleeve 208, acting on the land 207a of the plunger 207, thus applying to the plunger 207 the rightward force which assists the depressing movement of the plunger 207. Thus, the force required to push the plunger 207 by compressing the spring 307 is alleviated, alleviating the depressing force of the accelerator pedal. Irrespective of the fact that the reaction force of the spring 307 increases as the spring 307 is compressed, substantially constant accelerator pedal depression force is maintained because the throttle pressure increases as the spring 307 is compressed and the force derived from the throttle pressure to push the plunger 207 also increases. Under the kickdown condition, the plunger 207 is pushed inwardly to the position illustrated by the upper half thereof as viewed in FIG. 2(c), allowing port 108e to communicate with port 108a via the inside of the sleeve 208, thus allowing the oil pressure in conduit 420 to be supplied to conduit 418. Because, under the kickdown condition, the spool 206 of the throttle valve 6 is also pushed inwardly to the position illustrated by the upper half section thereof, wherein port 106d is allowed to communicate with port 106c, the oil conduit 420 which normally serves as the throttle pressure circuit and has been supplied with the throttle pressure, is now supplied with the line pressure. Consequently, line pressure also develops in conduit 418. Since the sleeve 208 is biased by the spring 308 to stay in the righward limit position thereof as illustrated by the upper half position thereof wherein ports 108c and 108d are allowed to communicate with each other via a groove between the lands 208a and 208b of the sleeve 208, the oil pressure in conduit 420 is admitted to the oil conduit 422. Normally, the throttle pressure develops in this conduit, however, under kickdown line pressure prevails therein.

If the throttle valve operating cable interconnecting the accelerator pedal with the plunger 207 should become disconnected or broken, the plunger 207 is pulled outwardly by a return spring, not shown, to move leftwardly as viewed in FIG. 2(c). This leftward movement of the plunger 207 causes the sleeve 208 to move to the position indicated by the lower half thereof as seen in FIG. 2(c). Thus, port 108b communicates with the port 108c, supplying the line pressure to the oil conduit 422 from conduit 402, causing the line pressure to rise to a peak value. Therefore, the transmission is prevented from becoming overheated or damaged due to low line pressure in the throttle valve operating cable is disconnected or broken. The automotive vehicle is therefore enabled to travel (such as to a repair shop) without heat generating slippage of the clutches and brakes. The throttle valve operating mechanism employed herein is disclosed and illustrated U.S. Pat. No. 4,301, 697 issued on Nov. 24, 1981 in the name of Kazuyoshi IWANAGA et al. The disclosure relating to this valve is hereby incorporated by reference thereto.

Referring to FIG. 2(c), the throttle modulator valve 10 comprises a valve bore 110 formed with five port 110a to 110e, a spool 210 having formed thereon three lands 210a to 210c slidably disposed in the valve bore 110, and a spring 310 biasing the spool 210 leftwardly as viewed in FIG. 2(c). The land 210a is larger in diameter than the diameter of the lands 210b and 210c. Port 110a and 110d are connected with conduit 420 (throttle pressure circuit), while port 110b is connected with conduit 418 (kickdown circuit). Port 110c and 110e are connected via a conduit 424 with a port 122d of the 3-3 shift valve 22 shown in FIG. 2(b). Port 110e is provided with an orifice 612 at an inlet thereof.

With the throttle modulator valve 10 thus constructed, since, when not under the kickdown condition, port 110b acts as drain port via conduit 418, a pressure regulation is effected with port 110d (which is supplied with the throttle pressure) as a high pressure side port and port 110b as a drain port. The equilibrium state of the spool 210 is accomplished when a rightwardly directed force due to the oil pressure (throttle pressure) in port 110a acting on the land 210a balances with the sum of a leftwardly directed force derived from an oil pressure in port 110e acting upon the land 210c and a leftwardly directed force due to the spring 310. The oil pressure prevailing at port 110e (hereinafter referred to as "throttle modulator pressure") varies depending on the throttle pressure. This throttle modulator pressure is transmitted via the previously mentioned conduit 424 to the 2-3 shift valve 22 to control same. Under kickdown, port 110b which has been a drain port is supplied with the kickdown pressure (line pressure) and thus the throttle modulator valve 10 is moved to the upper half position thereof and ceases its pressure regulating function, allowing the line pressure to appear in conduit 424.

The pressure modifier valve 12 comprises a valve bore 112 formed with five ports 112a to 112e, a spool 212 having formed thereon the same diameter lands 212a and 212b slidably disposed in the valve 112, and a spring 312 which biases the spool 212 downward as seen in FIG. 2(c). Ports 112a and 112b are both drain ports. Ports 112c and 112e are connected via the previously mentioned oil conduit 411 with port 102i of the regulator valve 2, while port 112d is connected via conduit 426 with a port 506c of a shuttle valve 506. Port 112e is porvided with an orifice 622. With the pressure modifier valve 12 thus constructed, a pressure regulating function is effected with port 112d (which is supplied with the throttle pressure or the line pressure as will be later described) as a high pressure port and with the port 112b as a drain port. The equilibrium state of the spool 212 is accomplished when an upward force, as seen in FIG. 2(c), derived via the oil pressure in the port 112e acting on the land 212b balances with a downward force provided by the spring 312. Thus, the oil pressure in port 112e hereinafter referred to "pressure modifier pressure") has a constant value which is determined by the force of the spring 312. However, when the oil pressure supplied to the port 112d is low and the upward force does not overcome the force of spring 312, the pressure modifier valve 12 remains in the right half position thereof wherein the pressure regulating function is not effected, admitting the oil pressure in port 112d to conduit 411. Thus, the pressure in conduit 411 becomes equal to the pressure in conduit 426. Normally i.e., when the throttle valve operating cable is neither disconnected nor broken and the manual valve 4 is not placed in the "II" position, the throttle pressure is supplied via the port 108c of the throttle fail safe valve 8, conduit 422, the shuttle valve 506 and the conduit 426 to port 112d, thus providing the pressure modifier pressure. However, if the throttle valve operating cable should become disconnected or broken, the throttle fail safe valve 8 operates in the manner described before, allowing the line pressure to be supplied to conduit 422, thus maintaining the pressure modifier pressure constant. As will be later described, if the manual valve 4 is moved from the "D" position to "II" position, the line pressure is supplied from the line pressure booster valve 16 via conduit 428 to the port 506b of the shuttle valve 506, line pressure is supplied to port 112d irrespective of the level of the throttle pressure within the conduit 422, thus allowing the pressure modifier pressure to increase to a constant value. Since the pressure modifier pressure is introduced to port 102i of the regulator valve 2 via conduit 411, the line pressue increases in accordance with the magnitude of the pressure modifier pressure. The pressure modifier pressure is fed also to the cut back valve 14.

The cut back valve 14 comprises a valve bore 114 formed with seven ports 114a to 114g and a spool 256 having formed thereon three lands 214a to 214c slidably disposed in the bore. It also comprises a sleeve 256 formed with ports 256a and 256b in registry respectively with the ports 114f and 114g, and a spool 215 having formed thereon two lands 215a and 215b slidably disposed in the sleeve 256. The land 214a of the spool 214 is smaller in diameter than the lands 214b and 214c. The land 215a of the spool 215 is larger in diameter than the land 215b. Ports 114a and 114d are connnected with conduit 411 and are supplied with the previously mentioned pressure modifier pressure. Port 114b is a drain port. Ports 114c and 114g are connected with conduit 410, port 114e is connected with conduit 428, and port 114f is connected with a conduit 430 which forms part of a governor pressure circuit. The port 114g is provided with an orifice 614. The cut back valve 14 thus constructed, performs a pressure regulating function with pot 114d as a high pressure port and with port 114b as a drain port when the manual valve 4 is not placed in "II" position or the line pressure booster valve 16 is in the upper half position thereof as seen in FIG. 2(c) (i.e., when conduit 428 functions as drain). Under these conditions, the spools 214 and 215 move as if they were one piece and assume an equilibrium state when a rightwardly directed force derived from the pressure modifier pressure in port 114a acting on the land 214a balances with the sum of a leftwardly directed force derived from an oil pressure in port 114g acting on the land 215b and a leftwardly directed force derived from an oil pressure (governor pressure) in port 114f acting on a differential area between the lands 215a and 215b. As the governor pressure rises, the oil pressure in port 114g (hereinafter referred to as "cut back pressure") drops and when the governor pressure rises further beyond a predetermined value, the cut back valve 14 is moved to the lower half position thereof as viewed in FIG. 2(c), reducing the cut back pressure to zero. The cut back pressure drops as the pressure modifier pressure drops. Since the cut back pressure is introduced to port 102h of the regulator valve 2 via conduit 410, the line pressure decreases as the governor pressure increases and drops as the pressure modifier pressure falls. If the manual valve 4 is moved from the "D" position to the "II" position, the line pressure is supplied to port 114e of the cut back valve 14 via conduit 428, thus urging the spool 214 to move to the leftward limit position as seen in FIG. 2(c). Consequently, port 114c is allowed to communicate with drain port 114b, so the pressure in the conduit 410 drops to zero irrespective of the level of the governor pressure and the pressure modifier pressure.

The line pressure booster valve 16 comprises a valve bore 116 formed with six ports 116a to 116f, a spool having formed thereon three lands 216a to 216c slidably disposed in the valve bore 116, and a spring 316 biasing the spool 216 leftwardly as viewed in FIG. 2(c). The lands 126a to 216c are of the same diameter. The spool 216 is formed with a bore 216d which communicates with a groove between the lands 216a and 216b with the left end of the spool 216. The ports 116c and 116f are drain ports. Port 116d is connected with conduit 428, and port 116e is connected with conduit 414. Port 116b is connected via conduit 432 with a port 120h of the 1-2 shift valve 20 shown in FIG. 2(b), which port is adapted to be supplied with the line pressure when the 1-2 shift valve 20 is in the second speed ratio position (an upshift position thereof). The port 116a is connected via a conduit 434 with a port 122g of the 2-3 shift valve 22, which port is adapted to be supplied with the line pressure when the 2-3 shift valve 22 is in the third speed ratio position (an upshift position thereof). The line pressure booster valve 16 thus constructed operates in a first manner when the 2-3 shift valve 22 is moved from the second speed ratio position (the downshift position thereof) to the third speed ratio position and in a second manner when moved from the third speed ratio position to the second speed ratio position. Viz., when the 1-2 shift valve 20 is in either of the first speed ratio position or the second speed ratio position, the spool 216 of the line pressure booster valve 16 remains in the position illustrated by the upper half section thereof as viewed in FIG. 2(c) under the influence of the spring 316. When the 1-2 shift valve 20 is in the second speed ratio position, the line pressure is supplied to port 116b. This, however, does not cause the line pressure booster valve 16 to shift its position because the land 216b blocks the port 116b. In this state, port 116d communicates with the drain port 116c. When, subsequently, the 2-3 shift valve 22 is moved to the third speed ratio position, line pressure is supplied to conduit 434. The line pressure in conduit 434 passes through port 116a and the bore 216d of the spool 216 to act on the left end face of the spool 216, urging the spool 216 to move against the spring 316 rightwardly to the lower half position thereof as viewed in FIG. 2(c). In this position of the spool 216, port 116b is allowed to communicate with the bore 216d of the spool 216, while port 116a is blocked by the land 216a, so that the pressure in the oil conduit 432 now acts on the left end face of the spool 216. Thus, the line pressure booster valve 16 remains in the position illustrated by the lower half section thereof even after the 2-3 shift valve 22 subsequently returns to the second speed ratio position thereof. Even if the line pressure booster valve 16 is moved to the lower half position thereof, conduit 428 continues to be drained via port 116d, port 116e and oil conduit 414 to port 104e as long as the manual valve 4 is not in either of the "II" or "I" positions wherein the port 104e of the manual valve 4 functions as a drain port. However, when the manual valve 4 is placed either of in the "II" or "I" positions, since the line pressure is supplied to conduit 414, the line pressure is supplied via the ports 116e and 116d to the oil conduit 428. The line pressure in conduit 428 is supplied via the shuttle valve 506 to port 112d of the pressure modifier valve 12, causing the pressure modifier valve 12 to boost the line pressure. Therefore, in the case where the manual valve 4 is moved to the "II" position (or "I" position) while the vehicle is travelling in the third speed ratio, in order to effect a forced downshift to the second speed ratio and obtain effective engine braking, the line pressure is boosted to an adequately high level. If the 1-2 shift valve 20 is moved to the first speed ratio position, since the oil pressure in conduit 432 disappears, the line pressure booster valve 16 returns to the upper half position thereof, and stops boosting the line pressure.

The governor valve 18 is installed to rotate with the ouput shaft 0 of the automatic transmission and effects pressure regulating using the line pressure (i.e., the line pressure is fed to the governor valve 18 when the manual valve 4 is in any of the "D", "II" or "I" positions) so as to supply an oil pressure (governor pressure) variable with the vehicle speed.

Referring to FIG. 2(b), the 1-2 shift valve 20 comprises a valve bore 120 formed with eleven ports 120a to 120k, two spools 220 and 221 slidably disposed in the valve bore 120, and a spring 320 biasing the spool 220 downward as viewed in FIG. 2(b). The spool 220 is formed with three lands 220a to 220c which are larger in diameter in this sequence, while the spool 221 is formed with lands 221a to 221d (lands 221a to 221c are the same in diameter, while land 221d is larger in diameter than the former three). Ports 120a, 120f and 120i are drain ports. Port 120b is connected with the conduit 418 (kickdown pressure circuit). Port 120b is arranged such that the oil pressure therein acts on a differential area between the lands 220a and 220b when the spool 220 is in the lower position thereof indicated by the right half section thereof as seen in FIG. 2(b), urging the spool 200 downward, and acts on a differential area between the lands 220a and 220c when the spool 220 is in the upper position thereof indicated by the left half sections thereof, urging the spool 200 downward. Port 120c is connected with conduit 420 (throttle pressure circuit). Port 120c is arranged such that the pressure therein acts on a differential area between the lands 220b and 220c when the spool 220 is in the down position thereof so as to urge the spool 220 downward, but no downward force is provided when the spool 220 is in its upper position because the oil pressure acts on the circumference of the land 220c. Ports 120j and 120k are connected with conduit 430 (governor pressure circuit). These ports are arranged such that the governor pressure acts on an area (which is equal to the area of the land 221c) resulting from the difference in differential area between the lands 221d and 221c and the area of the land 221d when the spool 221 is in the downshift position thereof, urging the spool 221 upwardly, and acts on the area of the land 221d when the spool 221 is in the upshift position thereof, urging the spool 221 upward. Port 120g which is connected with the oil conduit 412 is blocked by the land 221b when the spool 221 is in the downshift position thereof, while it communicates via port 120h with conduit 432 when the spool 221 is in the upshift position thereof. The conduit 432 is connected with the servo apply chamber S/A of the brake B2 shown in FIG. 2(a). Port 120d is connected via the conduit 436 with port 502c of the shuttle valve 502 shown in FIG. 2(c). Port 120d is adapted to communicate with port 120e when the spool 221 is in the downshift position thereof. Port 120e is connected via a conduit 438 with the brake B1 shown in FIG. 2(a). With the 1-2 shift valve 20 thus constructed, the supply of the pressurized oil to the servo apply chamber S/A and the brake B1 is controlled depending upon the downshift position of the spool 221 or upshift position thereof.

The 2-3 shift valve 22 comprises a valve bore 122 formed with ten ports 122a to 122j, a spool 222 having formed thereon five lands 222a to 222e slidably disposed in the valve bore 122, a plug 223 axially slidable near the closed end of the valve bore 122, and a spring 322 arranged between the spool 222 and the plug 223. The lands 222a to 22c are larger in diameter in this sequence, the land 222c is the same in diameter as the land 222d, and the land 222e is larger in diameter than the former two. Ports 122b and 122h are drain ports. Port 122a is connected with the conduit 414 (which is supplied with the line pressure when the manual valve 4 is in the "II" position or "I" position), and is arranged such that the pressure therein acts on the upper end face of the plug 223. Port 122c is connected with conduit 418 (kickdown pressure circuit) and is arranged such that the pressure in the port 122c acts on a differential area between the lands 222a and 222b of the spool 222, urging the spool 222 downward as viewed in FIG. 2(b). Port 122d is supplied with a throttle modulator pressure from conduit 424 and is arranged such that the throttle modulator pressure acts on a differential area between the lands 222b and 222c when the spool 222 is in the upshift position thereof, urging the spool 222 downward as viewed in FIG. 2(b). Port 122e is supplied with a throttle pressure from conduit 420 and is arranged such that the throttle pressure acts on a differential area between the lands 222b and 222c of the spool 222 when the spool 222 is in a downshift position thereof, urging the spool 222 downward. Ports 122i and 122j are supplied with the governor pressure from conduit 430, and are arranged such that the governor pressure acts on an area (i.e., the area of the land 222d) resulting from the difference in differential area between the lands 222e and 222d and the area of the land 222e when the spool 222 is in the downshift position thereof, urging the spool 222 upward, while it acts on the area of the land 222e when the spool 222 is in the upshift position thereof, urging the spool 222 upward. The port 122f is provided with an orifice 616 and is connected with conduit 432. Port 122g is connected with conduit 434. Ports 122f and 122g are arranged such that they communicate with each other when the spool 222 is in the upshift position thereof. The conduit 434 is connected with the clutch C2 shown in FIG. 2(a). With the 2-3 shift valve 22 thus constructed, the supply of pressurized oil to the clutch C2 is controlled depending upon the downshift or upshift position of the spool 222.

The 3-4 shift valve 24 comprises a valve bore 124 formed with eleven ports 124a to 124k, a spool 224 having formed thereon four lands 224a to 224d, slidably disposed in the valve bore 124, a plug 225 axially slidable in the valve bore 124 near the closed end thereof, and a spring 324 arranged between the spool 224 and the plug 225. The lands 224a to 224c are the same in diameter while the land 224d is larger in diameter than the former lands. Port 124a is connected with conduit 420 (throttle pressure circuit) and is arranged such that the oil pressure in port 124a acts on the end face of the plug 225 so as to urge it downward as viewed in FIG. 2(b). Port 124b is connected via a conduit 440 with a port 508c of a shuttle valve 508. The oil pressure in this port 124b always acts on the upper side of the land 224a so as to urge the spool 224 downwardly. Port 124c is connected via an oil conduit 442 with the clutch C3 shown in FIG. 2(a). This port 124c is allowed to communicate with the port 124d which is connected via conduit 444 with the servo release chamber S/R of the brake B2 shown in FIG. 2(a) when the spool 224 is in the upshift position thereof. When the spool 224 is in the downshift position thereof, port 124d communicates with port 124e which is connected via conduit 434 with the clutch C2. Port 124f is connected via conduit 446 with a port 126d of the 2-4 timing valve 26, while port 124g is connected with the conduit 442. Ports 124f and 124g are allowed to communicate with each other when the spool 224 is in the upshift position thereof. The port 124g, on other hand, is allowed to communicate with port 124h which is connected with the oil conduit 412 when the spool 224 is in the downshift position thereof. Port 124i is a drain port. The ports 124j and 124k are connected with the conduit 430 (governor pressure circuit). Similarly to the previously mentioned 1-2 shift valve 20 and 2-3 shift valve 22, the ports 124j and 124k are arranged such that the governor pressure acts on the area of the land 224c when the spool 224 is in the downshift position thereof, urging the spool 224 upward, while when the spool 224 is in the upshift position thereof, the governor pressure acts on the area of the land 224d, urging it upward. With the 3-4 shift valve 24 thus constructed, the supply of pressurized oil to the clutch C3 and the servo release chamber S/R is controlled depending upon the downshift position or upshift position of the spool 224.

The 2-4 timing valve 26 comprises a valve bore 126 formed with six ports 126a to 126f and a spool 226 having formed thereon three lands 226a to 226c slidably disposed in the valve bore 126. The lands 226b and 226c are the same in diameter, while the land 226a is smaller in diameter than the former two. The ports 126a, 126c, and 126e are drain ports. Port 126e is provided with an orifice 602. An orifice 618 is provided in a conduit 446. Port 126b is supplied with the throttle pressure from the oil conduit 420 (throttle pressure circuit) and is arranged such that the throttle pressure in port 126b always acts on a differential area between the lands 226a and 226b so as to always urge the spool 226 downward. Port 126d is connected with conduit 446 and is allowed to communicate with port 126e when the spool 226 is in its lower position, but is allowed to communicate with port 126c when the spool 226 is in its upper position. Port 126f is connected via conduit 434 with the clutch C2. With the 2-4 timing valve 26 thus constructed, the pressurized oil is supplied to the clutch C2 and the pressurized oil from the clutch C3 is discharged at proper timing during 2-4 shift.

Referring to FIG. 2(a), the 2-3 timing valve 28 comprises a valve bore 128 formed with five ports 128a to 128e, a spool 228 having formed thereon three lands 228a to 228c slidably disposed in the valve bore 128, and a spring 328 biasing the spool 228 upwardly as viewed in FIG. 2(a). Port 128a is supplied with the governor pressure from conduit 430 so as to urge the spool 228 downward. As opposed to this force, the throttle pressure is supplied to port 128e from conduit 420 so as to urge the spool 228 upward. The port 128b is a drain port. Port 128c is connected with a portion of conduit 434 upstream of the check valve 750 and an orifice 650 (arranged in parallel), i.e., which portion is disposed on the side near the 2-3 shift valve 22, while port 128d is connected with a portion of conduit 434 downstream of the check valve 750 and the orifice 650 (a portion on the side near the clutch C2). With the 2-3 timing valve 28 thus constructed, the pressurized oil to be supplied to the clutch C2 is controlled depending upon the magnitude of the throttle pressure and that of the governor pressure so that the clutch C2 is engaged at proper timing during 2-3 shift.

The 3-4 timing valve 30 comprises a valve bore 130 formed with five ports 130a to 130e, a spool 230 having formed thereon three lands 230a to 230c slidably disposed in the valve bore 130, and a spring 330 biasing the spool 230 upward as viewed in FIG. 2(a). Port 130a is supplied with the governor pressure from conduit 430 so as to urge the spool 230 downward. As opposed to this force, the throttle pressure is supplied to port 130e from conduit 420 so as to urge the spool 230 upward. The port 130b is a drain port. Ports 130c and 130d are both connected with conduit 442. Port 130c is connected with a portion of conduit 442 upstream of a check valve 752 and an orifice 652 (arranged in parallel), i.e., which portion is disposed on the side near port 124c of the 3-4 shift valve 22, while port 130d is connected with the downstream portion which is disposed on the side near the clutch C3. With the 3-4 timing valve 30 thus constructed, the pressurized oil to be discharged from the clutch C3 is controlled depending upon the magnitude of the throttle pressure and that of the governor pressure so as to release the clutch C3 in proper timing during a 3-4 shift.

The 3-2 timing valve 32 comprises a valve bore 132 formed with five ports 132a to 132e, a spool 232 having formed thereon three lands 232a to 232c slidably disposed in the valve bore 132, and a spring 332 biasing the spool 232 upward as viewed in FIG. 2(a). Port 132a is supplied with the governor pressure from conduit 430 so as to urge the spool 232 downward. On the other hand, as opposed to this force, the throttle pressure is supplied to the port 132e from conduit 420 so as to urge the spool 230 upward. Port 132b is a drain port. Ports 132c and 132d are both connected with conduit 434. Port 132c is connected with a portion of conduit 434 upstream of a check valve 754 and an orifice 654 (arranged in parallel) which portion is disposed on the side directly connected with port 122g of the 2-3 shift valve 22, while, port 132d is connected with the downstream portion of conduit 434 which is diposed on the side directly connected with port 124e of the 2-3 shift valve 24. With the 3-2 timing valve 32 thus constructed, the pressurized oil to be discharged from the clutch C2 is controlled depending upon the magnitude of the throttle pressure and that of the governor pressure so as to release the clutch C2 at proper timing during a 3-2 shift.

Referring to FIG. 2(c), the manual first range pressure reducing valve 34 comprises a valve bore 134 formed with five ports 134a to 134e, a spool 234 having formed thereon two lands 234a and 234b, and a spring 334 biasing the spool 234 downward. Ports 134a and 134b are drain ports. Port 134d is connected with conduit 416 which is supplied with the line pressure when the manual valve 4 is in the "I" position, while the ports 134c and 134e are connected with conduit 448. Port 134e is provided with an orifice 620 at an inlet thereof. With the manual first range pressure reducing valve 34, a pressure regulation is effected with the port 134b as a high pressure port and with port 134b as a drain port until the oil pressure in port 134e balances with the force of the spring 334. Thus, the manual first range pressure reducing valve 34 functions to produce a predetermined constant oil pressure in conduit 448 which results from reducing the line pressure when the line pressure appears in conduit 416.

The 1-2 accmulator 38 comprises a stepped cylindrical bore 138, a piston 238 slidably disposed in the bore 138, and a spring 338 biasing the piston upwardly as viewed in FIG. 2(a). A chamber 138a defined by the larger diameter side of the piston 238 is connected with conduit 432, a chamber 138b defined by the smaller diameter side of the piston 238 is connected with conduit 402 (line pressure circuit), and an intermediate chamber 138c is a drain chamber. An orifice 656 and a check valve 756 are provided in parallel at that portion of the oil conduit 432 which is disposed upstream of the 1-2 accumulator 38 and the servo apply chamber S/A. The 1-2 accumulator 38 thus constructed functions to allow a gradual rise in the oil pressure in conduit 432 (i.e., the oil pressure in the servo apply chamber S/A) so as to effect a smooth 1-2 shift.

The 4-3 accumulator 40 comprises a cylindrical bore 140, a piston 240 slidably disposed in the cylindrical bore 140, and a spring 340 biasing the piston 240 upward as viewed in FIG. 2(a). An upper side chamber 140a defined by the piston 240 is connected with conduit 402 (the line pressure circuit), while the lower side chamber 140b is connected with conduit 442 which communicates with the clutch C3. A check valve 758 and an orifice 658 are arranged in parallel at a portion of the oil conduit 442 which is disposed upstream of the clutch C3 and the 4-3 accumulator 40. The 4-3 accumulator 40 thus constructed functions to allow a gradual rise in the oil pressure in conduit 442 (the oil pressure in the clutch C3) so as to effect a smooth 4-3 shift and so as to alleviate shock upon moving the manual valve 4 from the "N" position to the "D" position.

Referring to FIG. 2(a), the overdrive inhibitor solenoid 42 is provided to face an opening 409a formed in a conduit 409 which is connected at one end thereof with conduit 402 (line pressure circuit) and it comprises a plunger 42a which closes the opening 409a when the solenoid 42 is energized. The oil conduit 409 is connected with a port 504b of a shuttle valve 504. The overdrive inhibitor solenoid 42 is energized by a manually operable overdrive inhibitor switch SW. When the switch SW is in the off state thereof, the oil flowing into conduit 409 from conduit 402 is discharged from the opening 409a, whereby no pressure develops in the oil conduit 409. As will be noted, since the area of the orifice 604 is small, the line pressure in the oil conduit 402 is not affected even if the oil is discharged via the opening 409a. When the switch SW is turned on and the plunger 42a closes the opening 409a, conduit 409 is subject to the same pressure as that prevailing in conduit 402 (viz., line pressure). As a result, the 3-4 shift valve 24 is held in the downshift position thereof thus preventing an upshift to the fourth speed ratio (overdrive).

The clutches C1, C3, and the servo apply chamber S/A are provided with orifices 626, 628 and 630 at inlets thereof, respectively.

Referring to FIG. 2(a), the torque converter pressure reducing or limiting valve 36 comprises a valve bore 136 formed with five ports 136a to 136e, a spool 236 having formed thereon two lands 236a and 236b, and a spring 336 biasing the spool 236 leftwardly as viewed in FIG. 2(a). Ports 136d and 136e are drain ports. Port 136b is connected with conduit 406 which is supplied with pressurized oil discharged from port 102f of the regulator valve 2, while the ports 136a and 136c are connected via conduit 450 with the torque converter T/C. Port 136a is provided with an orifice 624 at an inlet thereof to smooth any fluctuations in the pressure prevailing in a variable volume feed-back chamber 137 defined at one end of the bore 136 by the spool 236.

Figure 1:
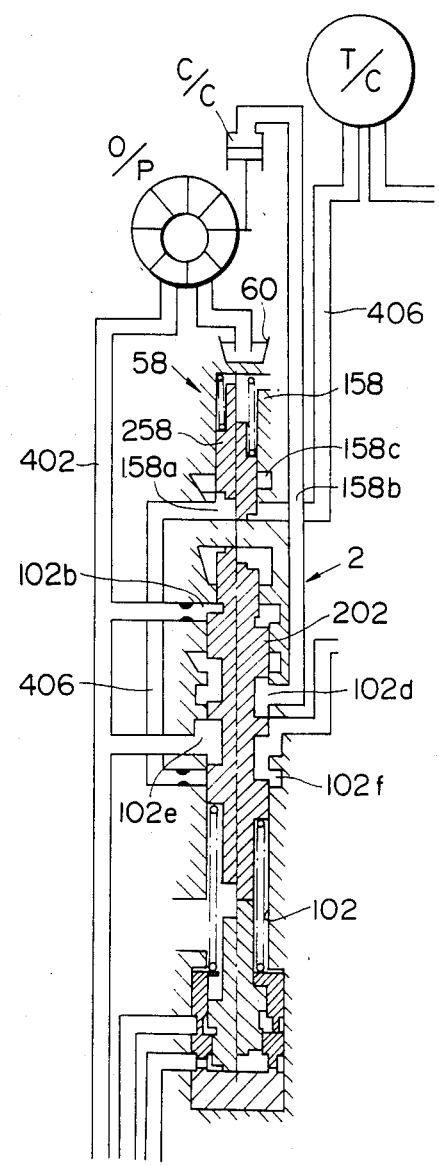
FIG. 1 is a schematic diagram, partially in section, of the "Internal prior art" arrangement discussed in the opening paragraphs of the instant disclosure.

With the torque converter pressure reducing valve 36 thus constructed, a pressure regulation is effected with port 136b as a high pressure port and with port 136b as a drain port until the force created by the oil pressure prevailing in the feed-back chamber and port 136a, balances with the force of the spring 336. Therefore, the torque converter pressure reducing valve 36 functions to provide a constant pressure to the torque converter T/C irrespective of the variation in oil pressure in conduit 406. This eliminates the continuous draining which plagues the arrangement of FIG. 1.

Figure 3:
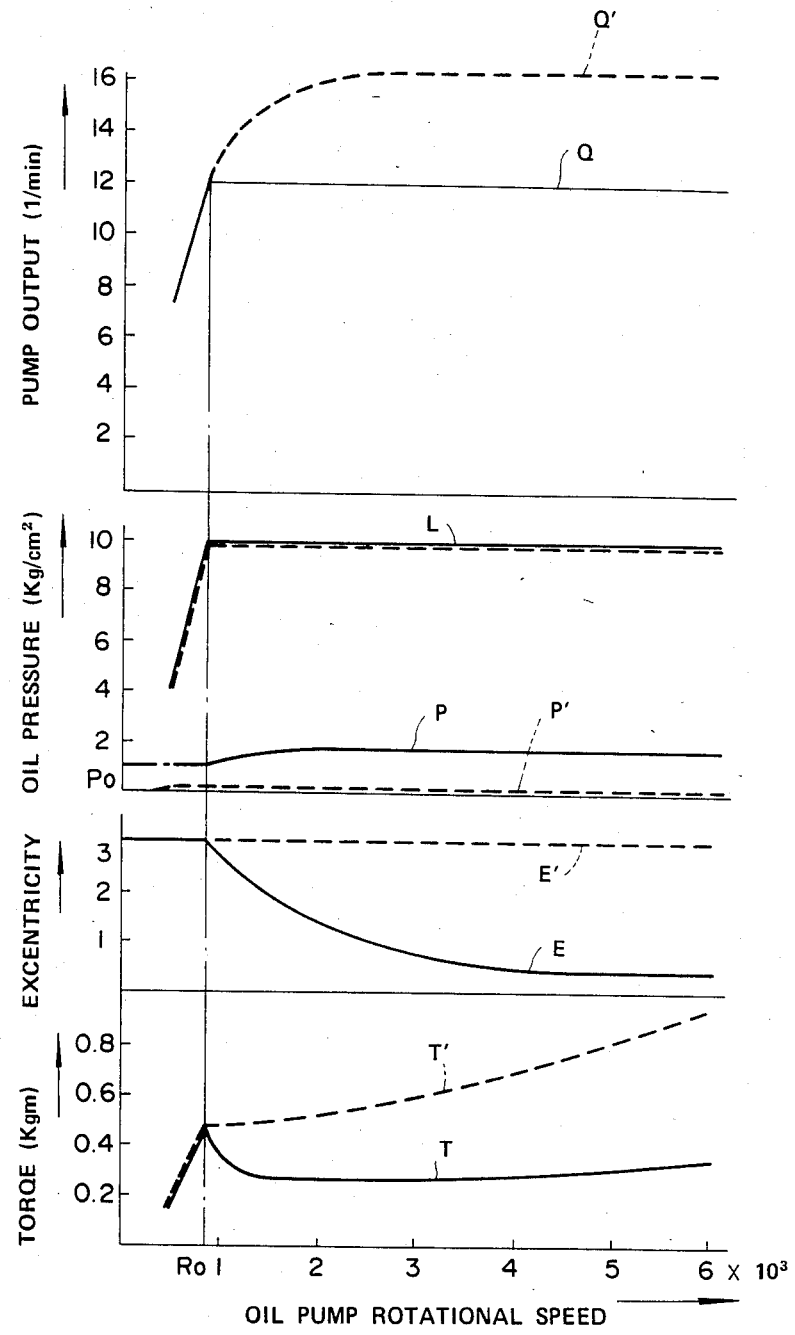
FIG. 3 shows graphically in terms of pump RPM, the ouput quantity (Q), the line pressure (L) developed by the pressure regulator valve associated with said pump, the pressure (P) prevailing in the control chamber of the pump, the degree of excentricity (E) of the pump element, and the torque consumed by the pump (T), respectively.

Accordingly, the pressure prevailing in the control chamber C/C of the pump O/P is controlled to the desired level as shown in FIG. 3 (solid line trace P) whereby the operation of the pump O/P is controlled appropriately in accordance with the line pressure discharged by the regulator valve 2 and the amount of torqe consumed by the pump reduced as shown by the solid line trace T at the bottom of FIG. 3.

The above arrangement enables the combination of the desired light weight construction of the torque converter along with the energy conserving characteristics possible with a variable capacity type oil pump, to be rendered a reality.

What is claimed is:

1. In a transmission, having a torque converter
   a hydraulic control circuit for controlling the transmission comprising:
   a variable capacity pump for supplying fluid under pressure, said pump having a control arrangement including a control chamber, said control arrangement varying the capacity of said pump in response to the pressure prevailing in said control chamber;
   a pressure regulator valve for regulating the output of said pump by draining off some of the fluid discharged by said pump and developing a control pressure, said pressure regulating pump having first and second drain ports, said first drain port fluidly communicating with said torque converter through a first conduit, said second drain port fluidly communicating with said control chamber through a second conduit; and
   a pressure limiting valve disposed in said first conduit for limiting the pressure fed to said torque converter through said first conduit, said pressure limiting valve having a feedback chamber which is supplied with the pressure prevailing in said first conduit downstream of said pressure limiting valve, the above arrangement being such as to maintain the pressure in said control chamber at a level which minimizes the power consumption of said pump with respect to the level of control pressure produced by said regulator valve
   wherein said pressure limiting valve comprises:
   a spool reciprocatively disposed in a bore,
   said bore including a variable volume feedback chamber defined therein by said spool, an inlet port which communicates with said first drain port, an outlet port which communicates with said torque converter, a drain port and a feedback port which is in fluid communication with said feedback chamber and said outlet port via a flow restriction,
   said spool being arranged to control the communication between said inlet and drain ports so as to control the pressure prevailing at said outlet port in response to the pressure prevailing in said feedback chamber.

2. A transmission as claimed in claim 1, wherein said pressure regulator valve comprises:
   a spool reciprocatively disposed in a bore, said bore being formed with said first and second drain ports, and an inlet port which communicates with said pump, said spool being arranged to alternatively discharge hydraulic fluid through said first and second drain ports in a manner to control the pressure prevailing in said control chamber to said level which minimizes the power consumption of said pump.

3. In a transmission having a torque converter
   a hydraulic control circuit for controlling the transmission comprising:
   a variable capacity pump for supplying fluid under pressure, said pump having a control arrangement including a control chamber, said control arrangement varying the capacity of said pump in response to the pressure prevailing in said control chamber;
   a pressure regulator valve for regulating the output of said pump by draining off a portion of the pressurized fluid discharged by said pump and developing a control pressure;
   a first drain port in said regulator valve;
   a second drain port in said regulator valve;
   a first conduit leading from said first drain port to said torque converter;
   a second conduit leading from said second drain port to said control chamber;
   a pressure limiting valve disposed in said first conduit between said regulator valve and said torque converter for limiting the pressure fed to said torque converter through said first conduit; and a feedback chamber defined in said pressure limiting valve, said feedback chamber being supplied with the pressure prevailing in said first conduit downstream of said pressure limiting valve.

4. In a hydraulic control circuit for an automatic automotive transmission having a pump;

a torque converter;

a regulator valve fluidly interposed between said pump and said torque converter; and a pressure limiting valve fluidly interposed between said regulator valve and said torque converter;

means defining a feedback chamber in said pressure limiting valve, said feedback chamber being fluidly communicated with a conduit which interconnects an output port of said pressure regulating valve and an input port of said torque converter through which hydraulic fluid from said pressure limiting valve is delivered to said torque converter.

* * * * *